(12) United States Patent  
Kimpara et al.

(10) Patent No.: US 9,960,398 B2  
(45) Date of Patent: May 1, 2018

(54) POWER SUPPLY APPARATUS

(71) Applicant: SUZUKI MOTOR CORPORATION, Shizuoka-Ken (JP)

(72) Inventors: Masatoshi Kimpara, Shizuoka-Ken (JP); Yohei Nakano, Shizuoka-Ken (JP); Satoru Takahashi, Shizuoka-Ken (JP)

(73) Assignee: SUZUKI MOTOR CORPORATION, Shizuoka-Ken (JP)

( * ) Notice: Subject to any disclaimer, the term of this patent is extended or adjusted under 35 U.S.C. 154(b) by 535 days.

(21) Appl. No.: 14/220,539

(22) Filed: Mar. 20, 2014

(65) Prior Publication Data  
US 2014/0287283 A1    Sep. 25, 2014

(30) Foreign Application Priority Data

Mar. 22, 2013 (JP) ................. 2013-060581  
Mar. 22, 2013 (JP) ................. 2013-060582  
Mar. 22, 2013 (JP) ................. 2013-060583

(51) Int. Cl.  
*H01M 2/10* (2006.01)  
*H01M 2/12* (2006.01)  
(Continued)

(52) U.S. Cl.  
CPC .......... *H01M 2/1094* (2013.01); *B63H 21/17* (2013.01); *H01M 2/1077* (2013.01);  
(Continued)

(58) Field of Classification Search  
None  
See application file for complete search history.

(56) References Cited

U.S. PATENT DOCUMENTS 4,160,857 A * 7/1979 Nardella ............... H01M 2/105  
429/97  
5,878,533 A * 3/1999 Swanfeld, Jr. ...... E04D 13/0762  
219/213  
(Continued)

FOREIGN PATENT DOCUMENTS

JP    09-223491 A    8/1997  
JP    10-210683 A    8/1998  
(Continued)

OTHER PUBLICATIONS

Japanese Office Action for Japanese Application No. 2013-060583, dated Aug. 9, 2016.  
(Continued)

*Primary Examiner* — Barbara L Gilliam  
*Assistant Examiner* — Zhongqing Wei  
(74) *Attorney, Agent, or Firm* — Barnes & Thornburg LLP

(57) ABSTRACT

A power supply apparatus that supplies electric power to an external electrical device through a cable is provided with a battery pack, and a battery pack case that houses the battery pack. The battery pack case includes a case body having an opening through which the battery pack to be taken in and out, a cover member that liquid-tightly closes the opening of the case body, in which at least one of the case body and the cover member is formed with a ventilation hole so as to penetrate therethrough, and a filter apparatus that does not allow liquid to pass therethrough but allows gas to pass therethrough is provided in the ventilation hole.

15 Claims, 14 Drawing Sheets

(51) Int. Cl.
*B63H 21/17* (2006.01)
*H01M 10/42* (2006.01)

(52) U.S. Cl.
CPC ....... *H01M 2/1264* (2013.01); *B60L 2200/32* (2013.01); *H01M 2010/4278* (2013.01); *H01M 2220/20* (2013.01)

(56) References Cited

U.S. PATENT DOCUMENTS

| | | | | |
|---|---|---|---|---|
| 7,165,661 | B2* | 1/2007 | Miyoshi | A45C 13/262 16/113.1 |
| 2009/0061289 | A1* | 3/2009 | Hamada | H01M 2/08 429/53 |
| 2010/0009244 | A1* | 1/2010 | Murata | H01M 2/12 429/53 |
| 2010/0291418 | A1* | 11/2010 | Zhou | H01M 2/1005 429/50 |
| 2011/0244739 | A1* | 10/2011 | Daikoku | B60L 11/1803 440/6 |
| 2012/0247338 | A1* | 10/2012 | Bauer | H01M 2/1241 96/6 |

FOREIGN PATENT DOCUMENTS

| | | | |
|---|---|---|---|
| JP | 2006-290197 | A | 10/2006 |
| JP | 2006-290198 | A | 10/2006 |
| JP | 2009099490 | A * | 5/2009 |
| JP | 2010-222827 | A | 10/2010 |
| JP | 2011213239 | A | 10/2011 |
| JP | 2011213241 | A | 10/2011 |
| JP | 3176417 | U | 5/2012 |
| JP | 2013-039888 | A | 2/2013 |

OTHER PUBLICATIONS

Japanese Office Action for Japanese Application No. 2013-060581, dated Sep. 27, 2016.

* cited by examiner

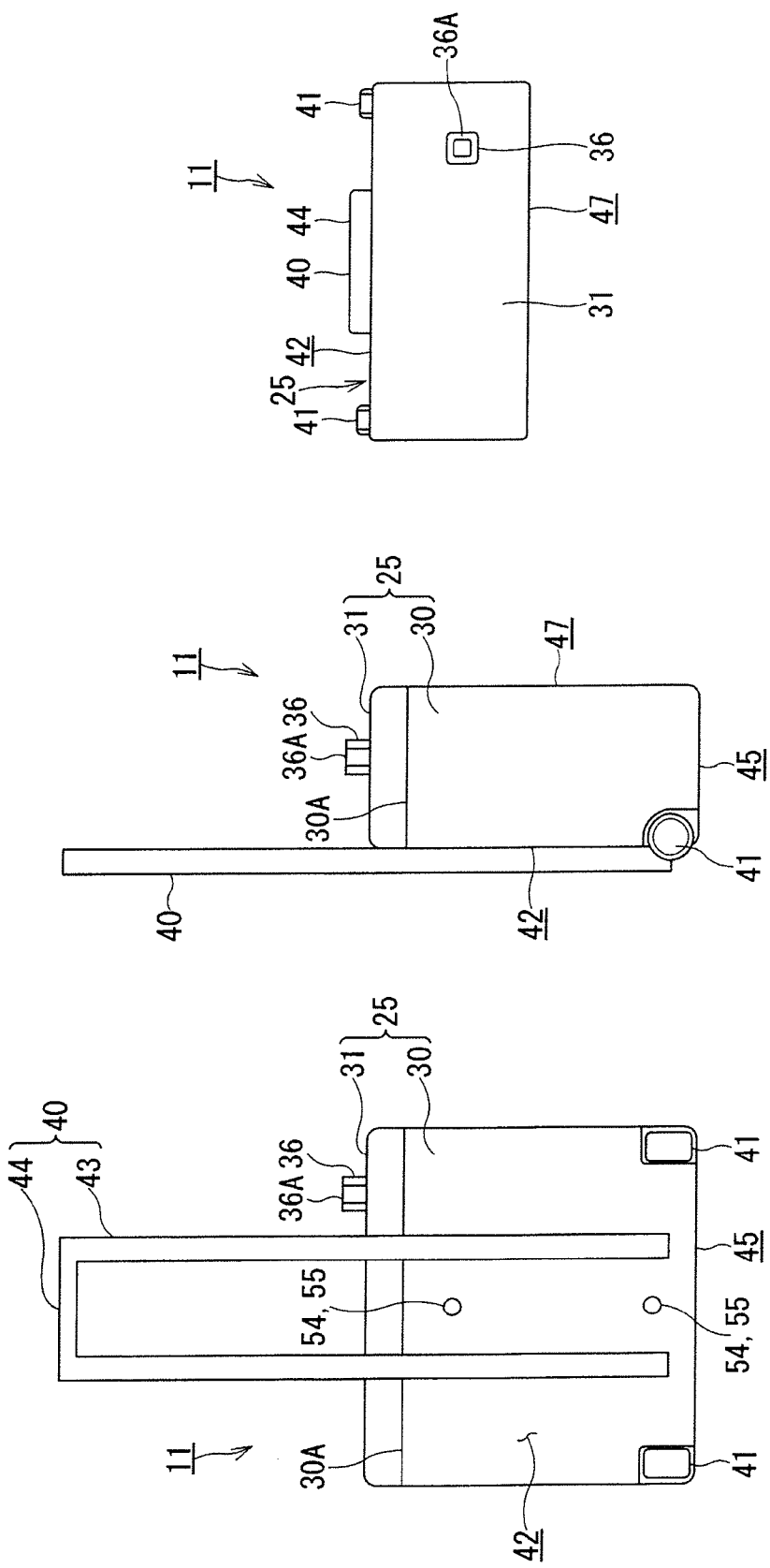

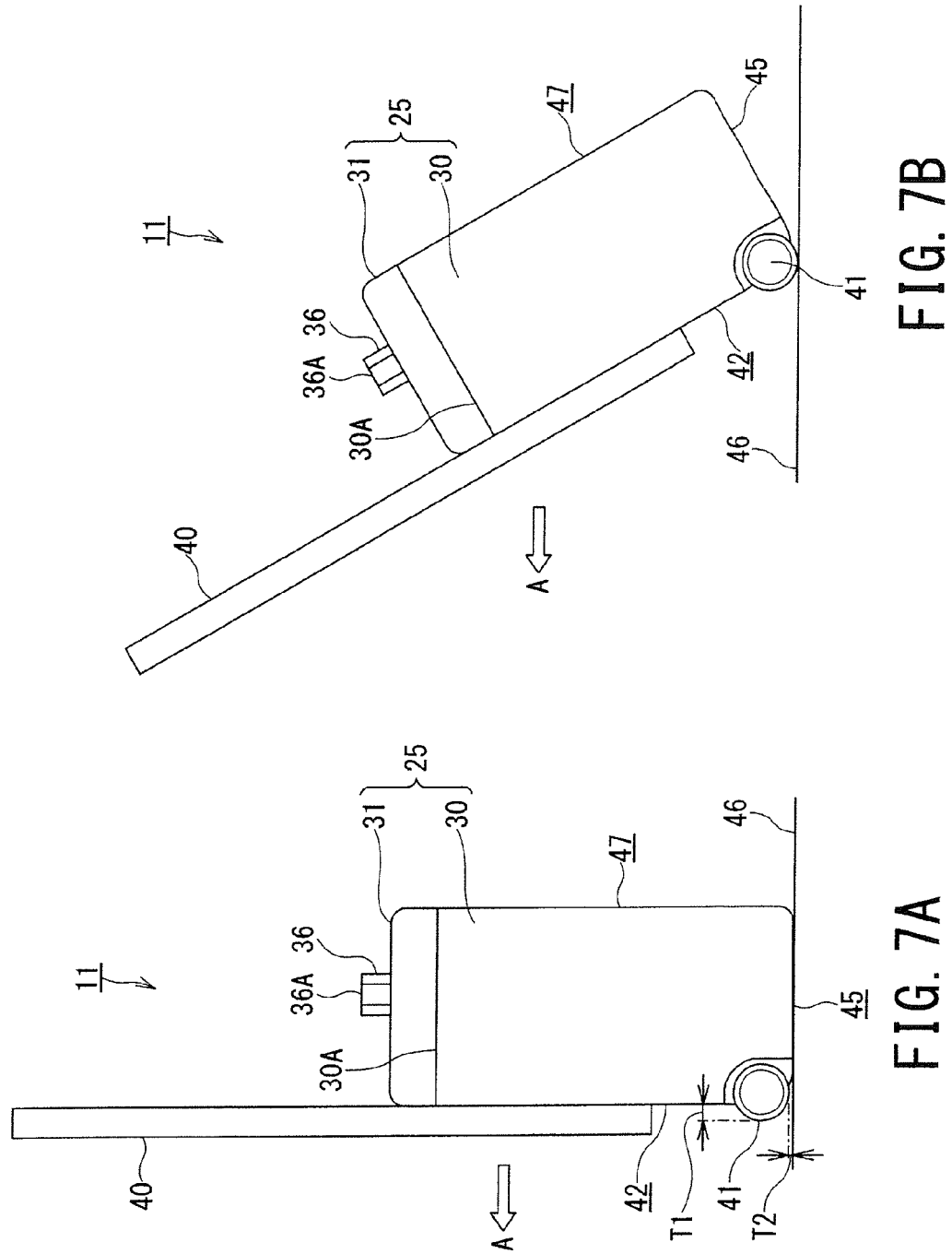

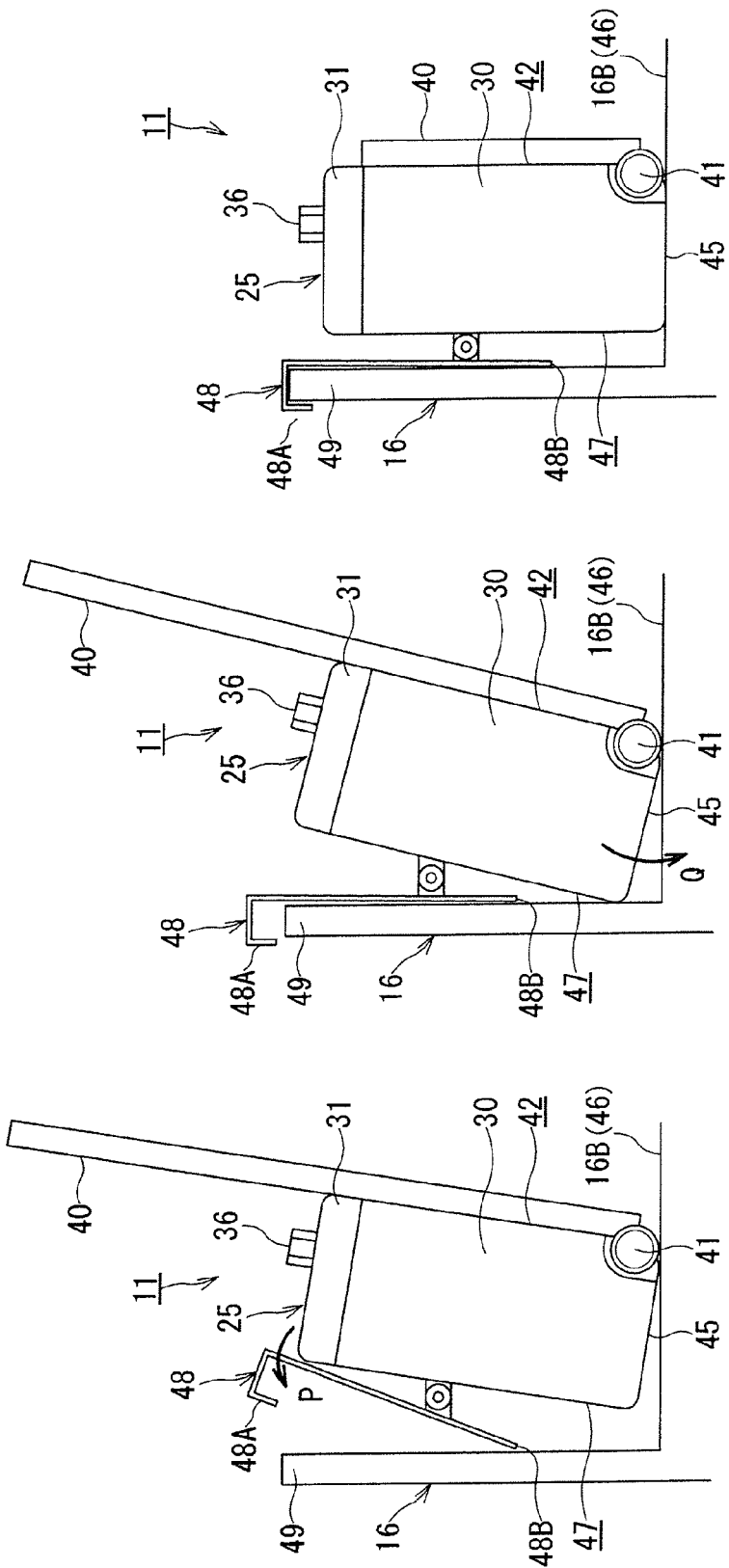

POWER SUPPLY APPARATUS

PRIORITY CLAIM

This patent application claims priority to Japanese Patent Application Nos. 2013-060581, filed 22 Mar. 2013; 2013-060582, filed 22 Mar. 2013; and 2013-060583, filed 22 Mar. 2013; the disclosures of which are incorporated herein by reference in their entirety.

BACKGROUND OF THE INVENTION

Field of the Invention

The present invention relates to a power supply apparatus that supplies electric power to an external electrical device, for example, an electric outboard motor.

Description of the Related Art

Japanese Patent Laid-Open No. 2011-213239 (Patent Document 1) and Japanese Patent Laid-Open No. 2011-213241 (Patent Document 2) each disclose a structure in which an electric outboard motor as an external electrical apparatus including an electric motor and a power supply apparatus or power supply unit that supplies electric power to the electric motor are configured as independent members. In the power supply apparatus disclosed in Patent Document 1 and Patent Document 2, a battery pack mount section including an opening to which a battery pack is mounted is provided on a side surface of a unit case, and the battery pack and the battery pack mount section are exposed to an outside of the unit case.

In general, most electric outboard motors are low-powered and used for small-sized fishing boats in many cases. Almost no small-sized fishing boat is equipped with a cabin (room) that can house a power supply apparatus (power supply device or unit), and hence, the power supply apparatus is generally installed on a deck of a hull (boat body).

If the power supply apparatus is unfortunately installed on the deck of the hull as described above, the power supply apparatus is exposed to rainwater and wave splashes. Hence, although countermeasures for preventing electric leakage, short circuit, and other problems due to the exposure to water are indispensable, Patent Documents 1 and 2 do not describe any countermeasures therefor.

Further, in Patent Document 1, the power supply apparatus is not provided with wheels, and hence, the power supply apparatus needs to be lifted up for its carriage. Particularly in a case where the battery pack has a high capacity, the carriage of the power supply apparatus is difficult.

SUMMARY OF THE INVENTION

The present invention was conceived in consideration of the circumstances mentioned above, and an object thereof is to provide, for example, a power supply apparatus that is provided as an apparatus or unit independent of an electrical device such as an electric outboard motor, capable of being moved and carried safely and easily, improving waterproof properties of a battery pack, a battery pack controller, and other members housed in a battery pack case, favorably discharging gas generated from the battery pack, as well as having a high durability.

The above and other objects can be achieved according to the present invention by providing a power supply apparatus that supplies electric power to an external electrical device through a cable, comprising a battery pack, and a battery pack case that houses the battery pack, wherein the battery pack case includes:

a case body having an opening through which the battery pack to be taken in and out;

a cover member that liquid-tightly closes the opening of the case body, in which at least one of the case body and the cover member is formed with a ventilation hole so as to penetrate therethrough, and a filter apparatus that does not allow liquid to pass therethrough but allows gas to pass therethrough is provided in the ventilation hole.

It is desirable that the external electrical device is an electric outboard motor, and the electric power is supplied from the battery pack to an electric motor included in the electric outboard motor.

In a preferred embodiment, it may be desired that the battery pack case includes a cover member provided to be opened/closed by a hinge so as to open or close the opening of the case body, wherein the cable is housed in a cable housing portion and divided into an internal cable section that is connected to the battery pack and extends to the cover member inside of the case body, and an external cable section that extends from the cover member to the external electrical device, in which the internal cable section includes a horizontal portion connected to the battery pack and extending in a substantially horizontal direction along a bottom surface of the case body, and a vertical portion extending upward from the horizontal portion to the cover member inside of the case body and including a play portion that is indispensable to an opening/closing action of the cover member, and the cable housing portion that houses the vertical section is provided in a range between the bottom surface of the case body and the cover member inside of the case body.

In the above preferred embodiment, it is further desirable that the external electrical device is an electric outboard motor, and the electric power is supplied from the battery pack to an electric motor included in the electric outboard motor.

In a further preferred embodiment, it may be desired that the power supply apparatus further comprises: a battery pack mount unit to/from which the battery pack is attached or detached; and a battery pack controller that manages a state of the battery pack, in which the battery pack case has a box-shape structure that houses the battery pack, the battery pack mount unit, and the battery pack controller, wherein the power supply apparatus is used for an electric outboard motor as the external electrical device for a hull, the power supply apparatus is provided as an apparatus independent of the electric outboard motor, the electric outboard motor and the power supply apparatus are connected to each other through a cable, the battery pack case includes a case body including an opening through which the battery pack is taken in and out, and a cover member that liquid-tightly closes the opening of the case body, and the battery pack case is provided with a carrying handle extending in a vertical direction of the battery pack case on one side surface of an outer wall of the case body and wheels disposed in a lower corner portion of the one side surface on which the carrying handle is provided and assist movement using the carrying handle.

According to the present invention of the above aspect, the battery pack, the battery pack mount portion, and the battery pack controller are housed in the liquid-tight battery pack case. Hence, a waterproof mechanism does not need to be individually provided, and the power supply apparatus can be manufactured with reduced cost. Moreover, the carrying handle and the wheels that assist movement and carriage using the carrying handle are provided to the battery pack case. Hence, even if the battery pack has a high capacity and a heavy weight, the power supply apparatus including the battery pack can be safely and easily moved and carried.

Further features and effects of the present invention will become more apparent from the following description given with reference to the attached drawings.

BRIEF DESCRIPTION OF THE DRAWINGS

In the accompanying drawings:

FIG. 2 illustrate an installation condition on a hull, i.e., hull, of the power supply apparatus and the electric outboard motor shown in FIG. 1, in which

FIG. 6 illustrate a state in which a carrying handle is expanded in the power supply apparatus of FIG. 1, in which FIG. 6A is a rear view, FIG. 6B is a side view, and FIG. 6C is a plan view;

FIG. 7 illustrate the state in which the carrying handle is expanded in the power supply apparatus of FIG. 1, in which FIG. 7A is a side view illustrating a stopped state, FIG. 7B is a side view illustrating a moving state, and FIG. 7C to FIG. 7E are views illustrating procedures for engaging the power supply apparatus of FIG. 1 with a lock section of the hull after movement thereof;

FIG. 13 illustrate a modified embodiment of the power supply apparatus of FIG. 11, in which

DESCRIPTION OF THE PREFERRED EMBODIMENTS

Hereinafter, embodiments for carrying out the present invention are described with reference to the accompanying drawings.

In the following embodiments, a case where an external electrical device is an electric outboard motor is described, and a "front side" of the electric outboard motor is coincident with an advancing direction of a hull (boat) to which the electric outboard motor is mounted or attached.

First Embodiment (FIG. 1 to FIG. 7)

Figure 1:
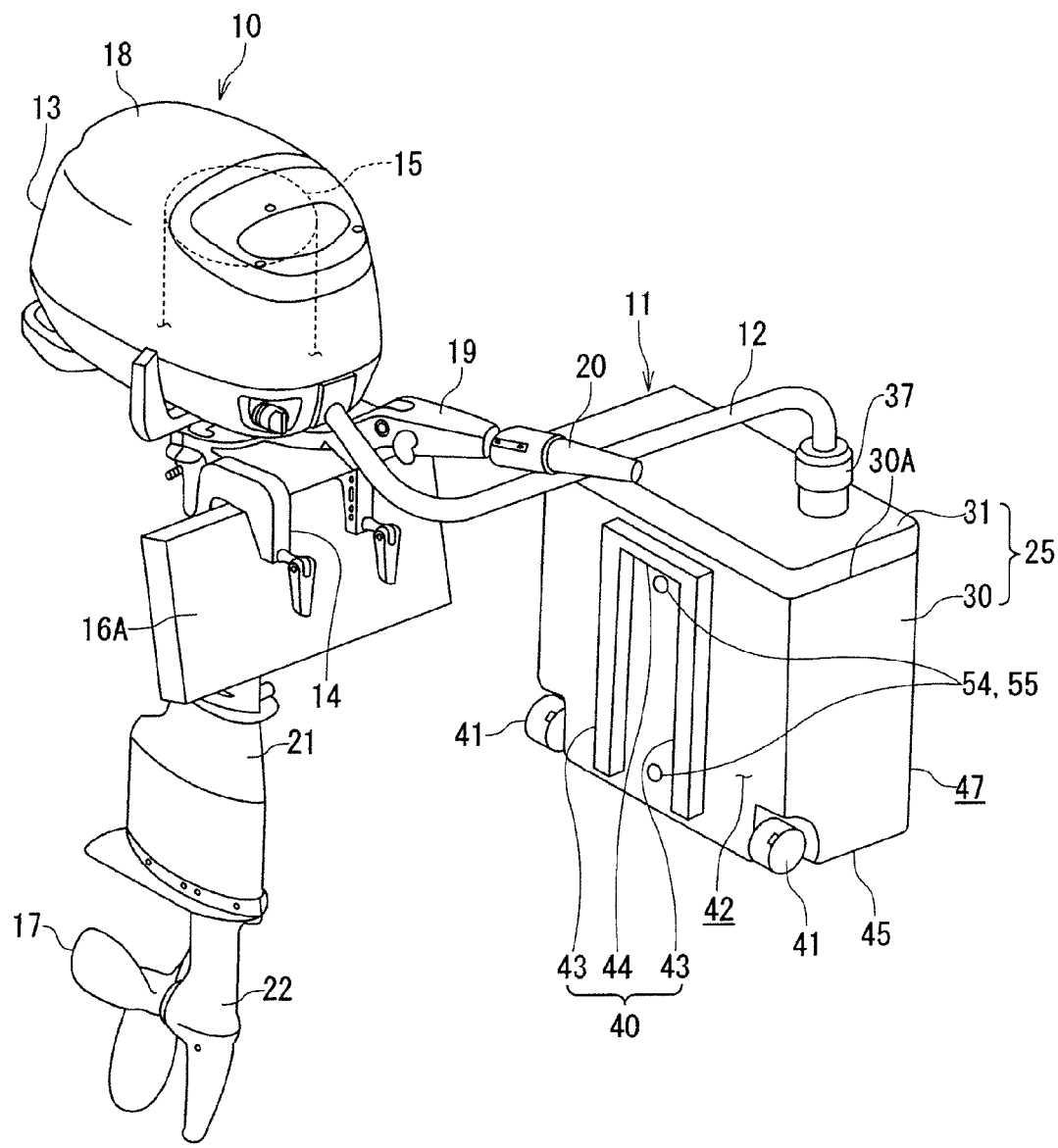
FIG. 1 is a perspective view illustrating a first embodiment of a power supply apparatus according to the present invention, together with an electric outboard motor as an electrical device.

An electric outboard motor 10 illustrated in FIG. 1 includes a built-in electric motor 15 as a drive source therefor, and a power supply apparatus 11 that supplies electric power to the electric motor 15 is provided independently of the electric outboard motor 10. The electric outboard motor 10 and the power supply apparatus 11 are connected to each other by means of external cable 12 for electric power supply and signal transmission. As described above, the electric outboard motor 10 is an external electrical device to which the power supply apparatus 11 supplies electric power.

Figure 2A:
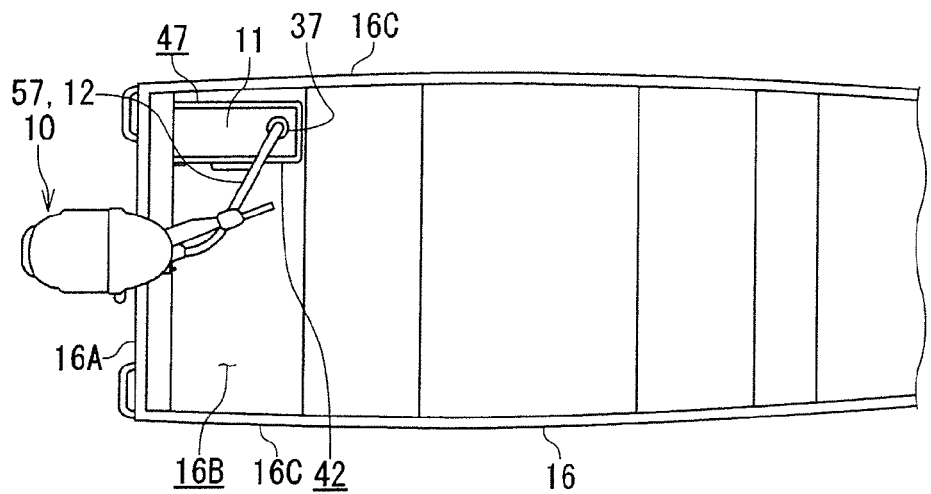
FIG. 2A is a plan view.
Figure 2B:
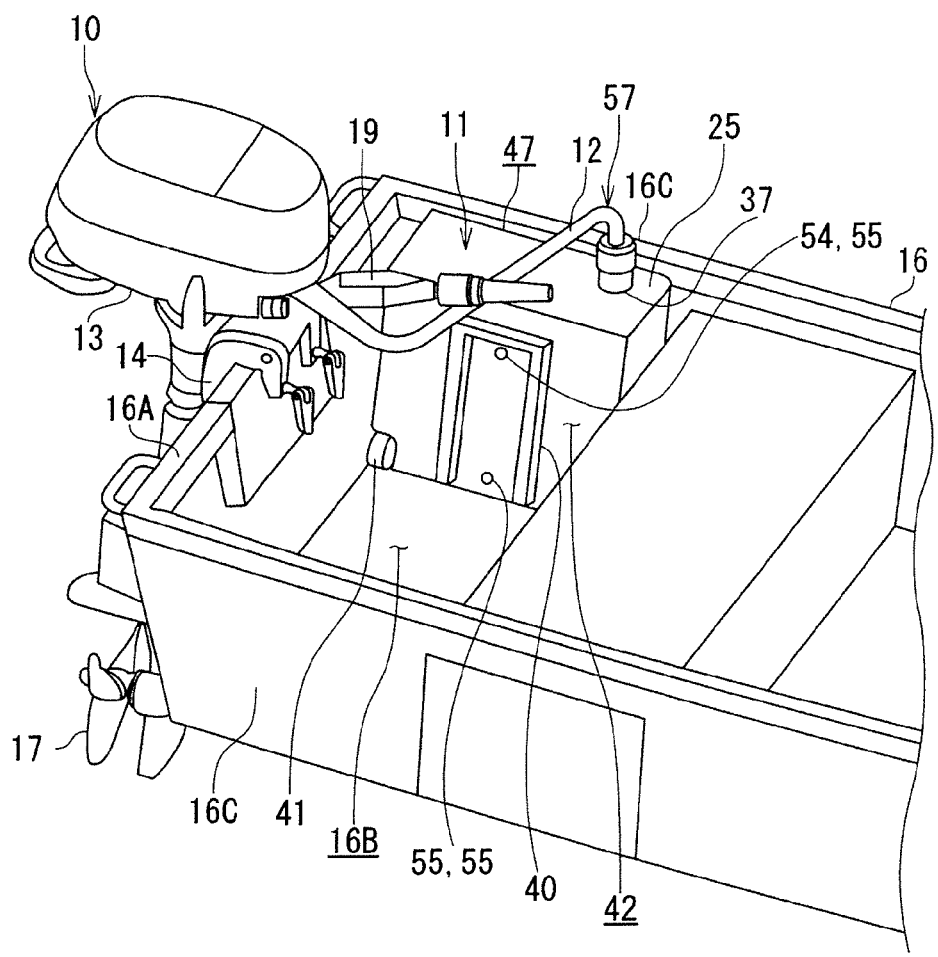
FIG. 2B is a perspective view.

The electric outboard motor 10 includes an outboard motor main body 13 and a mount (attachment) bracket 14, and the mount bracket 14 is used to mount the outboard motor main body 13 to a transom 16A of a hull 16 (FIG. 2). As illustrated in FIG. 1, the outboard motor main body 13 rotationally drives a propeller 17 located in a lower portion of the electric outboard motor 10, using drive force of the electric motor 15 disposed in an upper portion of the electric outboard motor 10.

That is, the outboard motor main body 13 includes a motor cover 18 in an upper portion thereof, and the electric motor 15 is housed inside the motor cover 18. A steering handle 19 is provided below and in front of the motor cover 18 so as to extend frontward, and a slot grip 20 for output adjustment of the electric motor 15 is provided at a leading end of the steering handle 19. The steering handle 19 includes a shift switch, not shown, for switching the electric motor 15 between forward rotation and backward rotation.

A drive shaft housing 21 is provided below the motor cover 18 so as to extend downward, and a gear case 22 is provided below the drive shaft housing 21. A drive shaft, not shown, is located inside of the drive shaft housing 21, and a propeller shaft, not shown, is located inside of the gear case 22. The propeller 17 is provided at a rear (back) end of the propeller shaft so as to rotate integrally therewith. The drive force of the electric motor 15 is transmitted to the propeller 17 through the drive shaft and the propeller shaft to rotate the propeller 17 forward or backward.

The mount bracket 14 can grip the transom 16A of the hull 16 and makes the outboard motor main body 13 pivotable in a horizontal direction and a vertical direction with respect to the hull 16. Accordingly, in the electric outboard motor 10, the outboard motor main body 13 can be trimmed and tilted in the vertical direction with respect to the hull 16. Further, a horizontal orientation of the outboard motor main body 13 is changed by operating the steering handle 19 in the horizontal direction, whereby the hull 16 can be steered.

Figure 3:
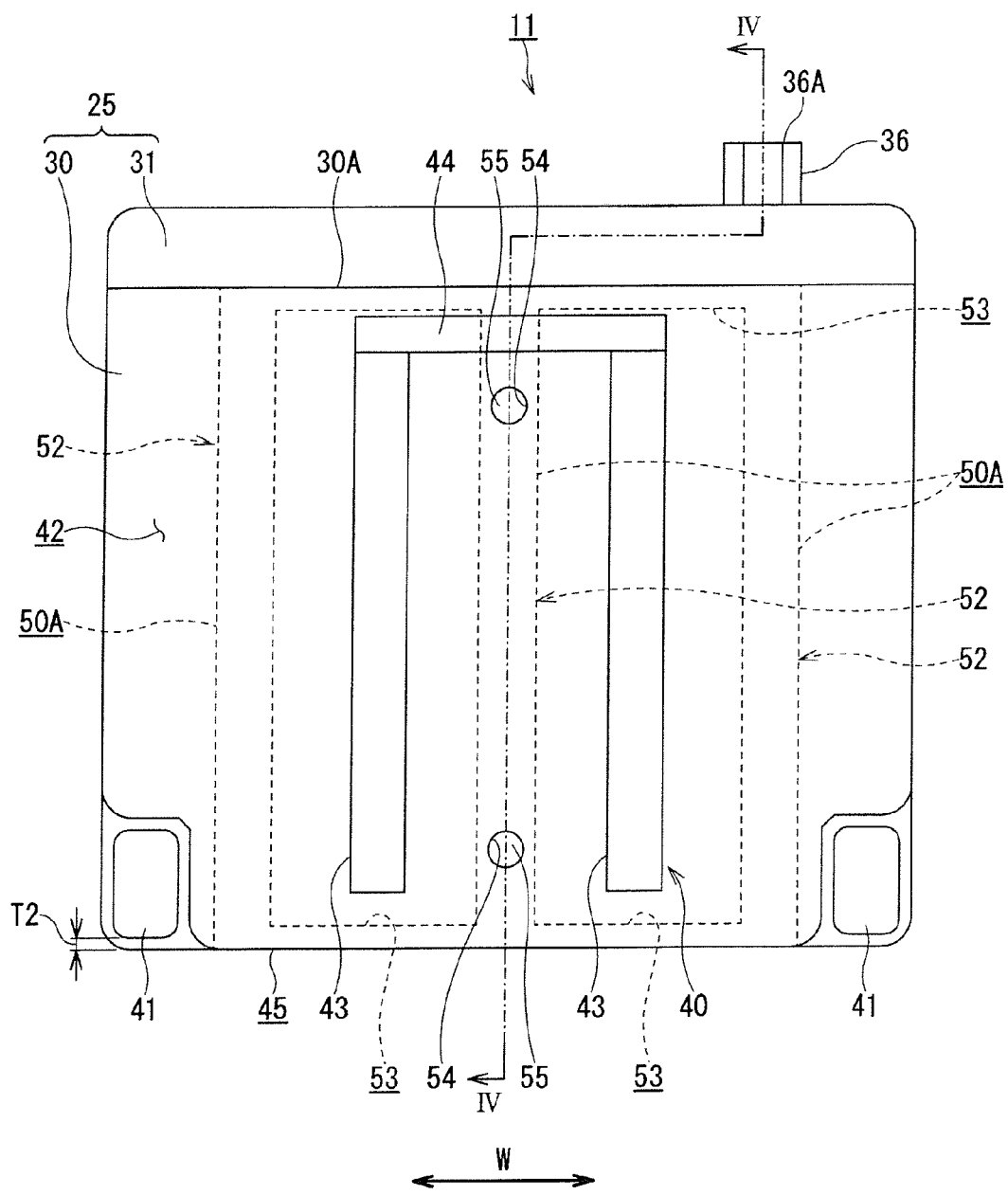
FIG. 3 is a rear view illustrating the power supply apparatus of FIG. 1.
Figure 4:
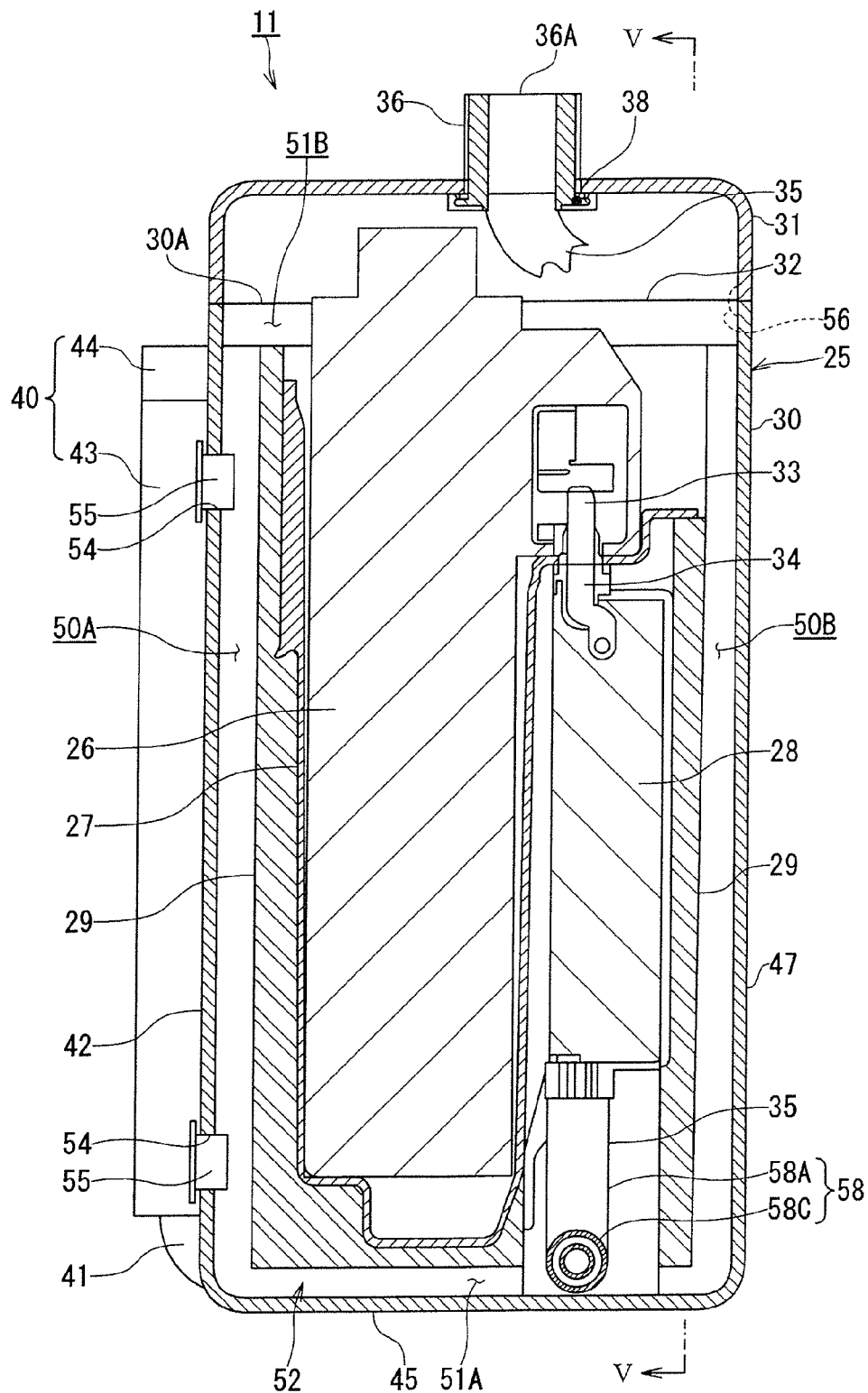
FIG. 4 is a cross sectional view taken along the line IV-IV in FIG. 3.

As illustrated in FIG. 2, the power supply apparatus 11 is installed on a deck 16B of the hull 16. As illustrated in FIG. 3 and FIG. 4, the power supply apparatus 11 includes a battery pack case 25, a battery pack 26, a battery pack holder 27 as a battery pack mount unit, a battery pack controller 28, and a foam 29 as a buffer (buffer member).

The battery pack 26 is a power supply (battery) that supplies electric power to the electric motor 15 of the electric outboard motor 10 and is configured as a package. The battery pack holder 27 is formed in a shape substantially similar to an outer shape of the battery pack 26, functions as an inner case, and detachably holds the battery pack 26. The battery pack controller 28 is attached to the battery pack holder 27, manages an operation and state of the battery pack 26, and controls the electric power that is supplied from the battery pack 26 to the electric motor 15 of the electric outboard motor 10.

The battery pack case 25 is formed in a box-like shape, houses the battery pack 26, the battery pack holder 27 and the battery pack controller 28, and includes a case main body 30 and a cover member 31. The case main body 30 is formed with an opening 30A that enables the battery pack 26 to be taken in and out, and the opening 30A is closed by the cover member 31. A seal material 32 having a liquid-tight function is interposed between the case main body 30 and the cover member 31.

The foam 29 is made of a material having elasticity, for example, an independent foam shaped member in which foam portions are independent of one another. The foam 29 fills a space between the case main body 30 of the battery pack case 25, and between the battery pack 26, the battery pack holder 27 and the battery pack controller 28, and holds the battery pack 26, the battery pack holder 27, and the battery pack controller 28 in a bufferable manner.

An output terminal 33 of the battery pack 26 is detachably connected to a battery pack connector 34 of the battery pack controller 28. The battery pack connector 34 is attached to the battery pack holder 27. The battery pack controller 28 is connected to a power supply apparatus side connector 36 by an internal cable 35 for electric power supply and signal transmission.

The external cable 12 illustrated in FIG. 1 is connected to the main body 13 of the outboard motor main body 13 of the electric outboard motor 10, extends from the main body 13 of the outboard, and has a leading end at which an outboard motor side connector 37 is disposed. The power supply apparatus side connector 36 is detachably connected to the outboard motor side connector 37. Electric power stored in the battery pack 26 is supplied to the electric motor 15 of the outboard motor main body 13 through the output terminal 33, the battery pack connector 34, the battery pack controller 28, the internal cable 35, the power supply apparatus side connector 36, the outboard motor side connector 37, and the external cable 12 in this order.

Figure 5:
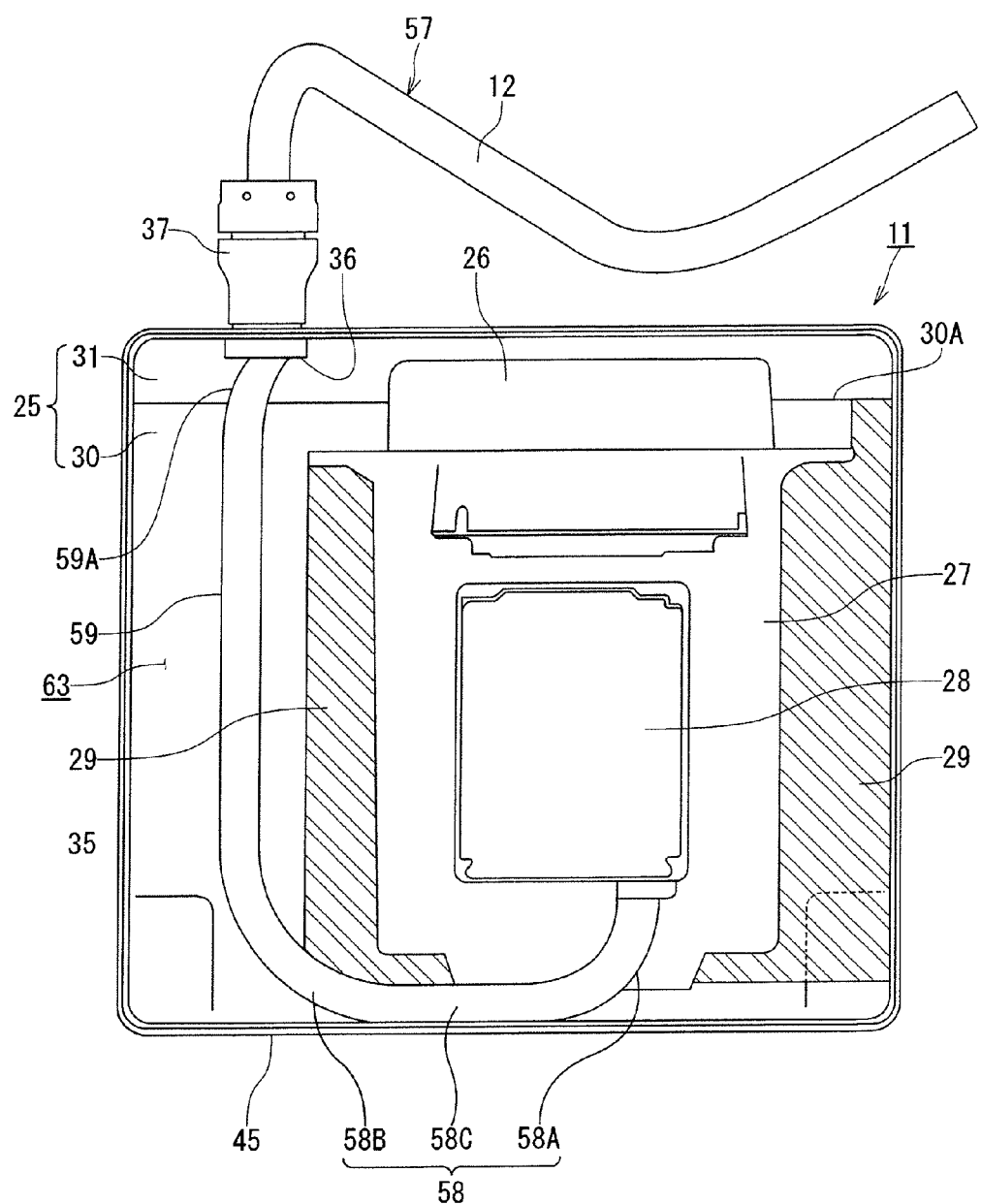
FIG. 5 is a cross sectional view taken along the line V-V in FIG. 4.

Accordingly, the power supply apparatus side connector 36 functions as an electric power take-out element of the power supply apparatus 11 that supplies electric power from the power supply apparatus 11 to the electric outboard motor 10. As illustrated in FIG. 4 and FIG. 5, the power supply apparatus side connector 36 is set in a top portion of the cover member 31 of the battery pack case 25, and a seal material 38 having a liquid-tight function is interposed between the power supply apparatus side connector 36 and the cover member 31. The seal material 38 and the aforementioned seal material 32 enable the battery pack case 25 to have a liquid-tight structure, so that a waterproof property of the battery pack case 25 is secured.

As illustrated in FIG. 3 and FIG. 6, the case body 30 of the battery pack case 25 is provided with a carrying handle 40 and a pair of wheels 41 for moving and carrying the power supply apparatus 11. The carrying handle 40 is provided on a rear surface 42 that is one side surface of an outer wall of the case body 30 so as to extend in a vertical direction. The carrying handle 40 includes a pair of shaft sections 43 as expandable/contractible tubular members and a handle section 44 bridged between leading ends of the shaft portions 43. The carrying handle 40 has a downward U-shape. When the power supply apparatus 11 is moved and carried, the shaft portions 43 of the carrying handle 40 are expanded. When the power supply apparatus 11 is mounted, the shaft sections 43 thereof are contracted.

The wheels 41 are provided in a lower corner portion of the rear surface 42 of the case body 30 on which the carrying handle 40 is provided so as to be movable by rolling, and assists movement of the power supply apparatus 11 using the carrying handle 40. More specifically, as illustrated in FIG. 3 and FIG. 7A, the wheels 41 are each provided for the case body 30 in a manner such that an outer diameter thereof protrudes toward a moving direction A (the rear surface 42 side) of the power supply apparatus 11 by a distance T1 from the rear surface 42 of the case body 30 and is located higher in the power supply apparatus 11 by a distance T2 than a bottom surface 45 of the case body 30.

The outer diameter of each wheel 41 protrudes toward the moving direction A of the power supply apparatus 11 by the distance T1 from the rear surface 42 of the case body 30. Accordingly, as illustrated in FIG. 7B, when the power supply apparatus 11 is inclined toward the carrying handle 40 side, the case body 30 separates from a mounting surface 46, and the wheels 41 come into contact with the mounting surface 46. As a result, the power supply apparatus 11 can be easily moved in the moving direction A by using the carrying handle 40 and the wheels 41. Furthermore, the outer diameter of each wheel 41 is located higher in the power supply apparatus 11 by the distance T2 than the bottom surface 45 of the case body 30. Accordingly, as illustrated in FIG. 3 and FIG. 7A, when the power supply apparatus 11 is erected to be mounted on the installation surface 46, the wheels 41 separate from the mounting surface 46, and the bottom surface 45 of the case body 30 comes into contact with the mounting surface 46. As a result, frictional force between the bottom surface 45 and the mounting surface 46 enables the power supply apparatus 11 to be stably mounted on the mounting surface 46.

As illustrated in FIG. 3 and FIG. 4, the foam 29 is provided with a vertical passage 50A on its rear surface and a vertical passage 50B on its front surface in a manner such that the vertical passages 50A and 50B are each formed in a concave groove shape so as to extend in the vertical direction between the foam 29 and the case body 30 of the battery pack case 25. The vertical passages 50A and 50B are formed at the same position in a width direction W of the power supply apparatus 11 and serve as predetermined gaps between the battery pack case 25 and the battery pack 26.

The foam 29 is further provided with a horizontal passage 51A that communicates respective lower portions of the vertical passages 50A and 50B with each other. The foam' 29 is further provided with a horizontal passage 51B that communicates respective upper portions of the vertical passages 50A and 50B with each other in a vicinity of the opening 30A of the case main body 30. Accordingly, the vertical passages 50A and 50B and the horizontal passages 51A and 51B form a circulation passage 52 (that is, the vertical passage 50A, the horizontal passage 51A, the vertical passage 50B, and the horizontal passage 51B that are sequentially communicated with one another) that allows gas to circulate around the battery pack 26.

As illustrated in FIG. 3, a plurality of such circulation passages 52 are provided in the width direction W of the power supply apparatus 11, and are communicated with each other through communication passages 53. It is preferable that the communication passages 53 are each formed in a concave groove shape on at least one of the rear surface and the front surface of the foam 29.

Ventilation holes 54 that communicate an inside and an outside of the case main body 30 with each other are respectively formed in an upper portion and a lower portion of the battery pack case 25, that is, an upper portion and a lower portion of at least one of the case main body 30 and the cover member 31 (in the present embodiment, the upper portion and the lower portion of the case main body 30). The ventilation holes 54 are formed between the pair of shaft portions 43 of the carrying handle 40 in the case body 30. Accordingly, the ventilation holes 54 are located in the upper portion and the lower portion of the vertical passage 50A of one of the circulation passages 52 and are communicated with the vertical passage 50A.

A filter apparatus 55 is disposed in each of the upper and lower ventilation holes 54. The filter apparatus 55 does not allow liquid such as water to pass therethrough, but allows gas such as air to pass therethrough. Accordingly, rainwater and wave splashes can be prevented from invading into the battery pack case 25 through the filter apparatus 55, air inside and outside of the battery pack case 25 can flow out and in through the filter apparatus 55, and gas generated from the battery pack 26 can be discharged to the outside of the battery pack case 25 through the filter apparatus 55.

In the above-mentioned embodiment of the present invention, in a carrying mode illustrated in FIG. 3 and FIG. 7 (in particular, FIG. 7C to FIG. 7E), the battery pack case 25 may be further provided with an engaging portion 48 on a front surface 47 that is another side surface opposite to the rear surface 42 of the case body 30 on which the carrying handle 40 and the wheels 41 are provided. The engaging portion 48 engages with a lock portion 49 of the hull 16 to thereby serve to further stably mount the power supply apparatus 11 on the hull 16. That is, if a lower end 48B of the engaging portion 48 comes into contact with the hull 16 in a state where the power supply apparatus 11 is inclined toward the carrying handle 40 side, a hook portion 48A on the upper end side of the engaging portion 48 turns in an arrow P direction toward the hull 16 side (FIG. 7C). Then, if the power supply apparatus 11 turns in an arrow Q direction so as to be erected, the hook portion 48A of the engaging portion 48 engages with the lock portion 49 of the hull 16 (FIG. 7D and FIG. 7E).

According to the first embodiment of the structure or configuration described above, the following advantageous effects (1) to (10) can be achieved.

(1) As illustrated in FIG. 3 and FIG. 4, the seal materials 32 and 38 enable the battery pack case 25 of the power supply apparatus 11 to have the liquid-tight structure. Further, in the battery pack case 25 of the power supply apparatus 11, the filter apparatus 55 that does not allow liquid to pass therethrough but allows gas to pass therethrough is provided in each of the ventilation holes 54 formed in the upper portion and the lower portion of the case main body 30.

Accordingly, even in a case where the power supply apparatus 11 is used outdoor or on water, a waterproof property of the battery pack 26 can be secured, and it is possible to prevent a contact failure and an electric transmission failure due to rust of the output terminal 33 of the battery pack 26. Further, the gas generated from the battery pack 26 can be discharged to the outside through the filter apparatus 55, and hence, it is possible to reliably prevent damage due to an increase in the internal pressure of the battery pack case 25, and also prevent a flame that occurs if the gas is flammable gas.

(2) The ventilation holes 54 are respectively formed in the upper portion and the lower portion of the case body 30 of the battery pack case 25, and the filter apparatus (apparatuses) 55 are respectively placed in the ventilation holes 54. Hence, owing to flow-out and flow-in of air through the filter apparatus 55, air of increased (higher) temperature can be discharged to the outside of the battery pack case 25 from the upper filter apparatus 55, and air of lower temperature can be taken into the battery pack case 25 from the lower filter apparatus 55. A circulation action of such air convection can improve a cooling property of the battery pack 26 and can prevent temperature inside of the battery pack case 25 from becoming excessively high.

(3) The foam 29, which holds the battery pack 26, the battery pack holder 27, and the battery pack controller 28 in the bufferable manner inside of the battery pack case 25 of the power supply apparatus 11, is provided with the vertical passage 50A formed in the concave groove shape so as to extend in the vertical direction. The ventilation holes 54 are communicated with the upper portion and the lower portion of the vertical passage 50A. Hence, the ventilation holes 54 are not closed by the battery pack case 26, the battery pack holder 27 and other members. Accordingly, the battery pack case 25 can be reliably ventilated through the filter apparatus 55 arranged in the ventilation holes 54.

(4) The foam 29, which holds the battery pack 26, the battery pack holder 27 and the battery pack controller 28 in the bufferable manner inside of the battery pack case 25 of the power supply apparatus 11, is also provided with the vertical passage 50A on its rear surface and the vertical passage 50B on its front surface, the vertical passages 50A and 50B extending in the vertical direction. The lower portions of the vertical passages 50A and 50B are communicated with each other by the horizontal passage 51A, and the upper portions thereof are communicated with each other by the horizontal passage 51B, thereby forming the circulation passage 52 that allows gas to circulate. The ventilation holes 54 are communicated with the upper portion and the lower portion of the vertical passage 50A that forms the circulation passage 52. Accordingly, external air can be directly introduced into the circulation passage 52 through the filter apparatus 55 arranged in the ventilation holes 54, and hence, the external air is supplied to a space around the battery pack 26 held by the foam 29, thereby effectively cooling the battery pack 26.

(5) The foam 29, which holds the battery pack 26, the battery pack holder 27, and the battery pack controller 28 in the bufferable manner in the inside of the battery pack case 25 of the power supply apparatus 11, is made of the independent foam shaped member in which the foam portions have structures independent of one another. Accordingly, the gas generated from the battery pack 26 is not absorbed by the foam portions of the foam 29, and does not remain in the foam 29.

(6) The carrying handle 40 that extends in the vertical direction is provided on the rear surface 42 of the case body 30 of the battery pack case 25, and the ventilation holes 54 are formed between the pair of shaft sections 43 of the carrying handle 42 on the rear surface 42 of the case body 30. Accordingly, the ventilation holes 54 and the filter apparatus 55 disposed in the ventilation holes 54 can be protected by the pair of shaft portions 43 against damage due to a collision with an external article.

(7) As illustrated in FIG. 3 and FIG. 4, the battery pack 26, the battery pack holder 27, and the battery pack controller 28 are housed in the liquid-tight battery pack case 25. Hence, a waterproof mechanism does not need to be individually provided for the battery pack 26, the battery pack holder 27, and the battery pack controller 28, and hence, the power supply apparatus 11 can be manufactured with reduced cost.

(8) As illustrated in FIG. 1, FIG. 2, and FIG. 7, the carrying handle 40 and the wheels 41 that assist movement and carriage by using the carrying handle 40 are provided to the battery pack case 25. Hence, even if the battery pack 26 has a high capacity and a heavy weight, the power supply apparatus 11 provided with the battery pack 26 can be safely and easily moved and carried. When the power supply apparatus 11 is installed on the hull 16, the wheels 41 do not come into contact with the deck 16B (mount or installation surface 46) of the hull 16, and the bottom surface 45 of the case body 30 comes into contact with the deck 16B (mount surface 46) of the hull 16. Hence, the power supply apparatus 11 can be stably mounted on the hull 16.

(9) As illustrated in FIG. 1, FIG. 4, and FIG. 5, the power supply apparatus side connector 36 of the power supply apparatus 11 is detachably connected to the outboard motor side connector 37 provided at the leading end of the external cable 12 that extends from the main body 13 of the outboard motor 10, and hence, the external cable 12 and the power supply apparatus 11 can be easily separated from each other. Accordingly, when the power supply apparatus 11 is moved and carried, the external cable 12 does not disturb the movement.

(10) As illustrated in FIG. 7 (FIG. 7C to FIG. 7E), the battery pack case 25 of the power supply apparatus 11 is provided with the engaging portion 48 to be engaged with the lock portion 49 provided to the hull 16. In this case, in the course of returning the power supply apparatus 11 from an inclined posture for movement to an erected posture, the engaging portion 48 can be engaged with the lock portion 49 of the hull 16. As a result, without the need for troublesome fixing work, the power supply apparatus 11 can be stably and reliably mounted to the hull 16 through a simple operation.

Alternatively, for example, the ventilation hole 54 may be formed in only one of the upper portion and the lower portion of the rear surface 42 of the case body 30 of the battery pack case 25, and the filter apparatus 55 may be placed in the ventilation hole 54. More specifically, in a case where it is apparent that a specific gravity of the gas generated from the battery pack 26 is lower than that of air and that an increase in temperature inside of the battery pack case 25 does not influence the performance of the battery pack 26, the ventilation hole 54 and the filter apparatus 55 may be only located to the upper portion of the rear surface 42 of the case body 30. On the other hand, in a case where it is apparent that the specific gravity of the gas generated from the battery pack 26 is higher than that of air and that an increase in temperature inside of the battery pack case 25 does not influence the performance of the battery pack 26, the ventilation hole 54 and the filter apparatus 55 may be located to only the lower portion of the rear surface 42 of the case body 30.

In the power supply apparatus 11, the foam 29, which holds the battery pack 26 in the bufferable manner, may not include therearound the circulation passage 52 formed by the vertical passages 50A and 50B and the horizontal passages 51A and 51B, and may include only the vertical passage 50A communicated with the ventilation hole 54 formed on the rear surface of the case body 30.

In the power supply apparatus for the electric outboard motor having the above-mentioned structure of the first embodiment, as illustrated in FIG. 4, the cover member 31 swings with respect to the case body 30 by means of a hinge 56 provided between the cover member 31 and the front surface 47 of the case body 30 to open or close the opening 30A of the case body 30.

The internal cable 35 and the external cable 12 shown in FIG. 4 and FIG. 5 are defined by dividing a cable 57 that extends from the battery pack 26 (more precisely, the battery pack controller 28) of the power supply apparatus 11 to the electric outboard motor 10. The internal cable 35 and the external cable 12 are connected to each other by coupling between the power supply apparatus side connector 36 attached to the internal cable 35 and the outboard motor side connector 37 attached to the external cable 12 so as to constitute the continuous cable 57. The cover member 31 is made liquid-tight with the cable 57 by the seal material 38 interposed between the power supply apparatus side connector 36 attached to the internal cable 35 and the cover member 31.

As described above, the internal cable 35 is connected to the battery pack 26 (more precisely, the battery pack controller 28), and extends therefrom to the power supply apparatus side connector 36 attached to the cover member 31 inside of the case body 30. As illustrated in FIG. 1 and FIG. 5, the external cable 12 extends from the outboard motor side connector 37 coupled to the power supply apparatus side connector 36 attached to the cover member 31, to the electric outboard motor 10. The internal cable 35 includes a horizontal section 58 and a vertical section 59.

The horizontal section 58 of the internal cable 35 is a portion that is connected to the battery pack 26 (more precisely, the battery pack controller 28) and extends in the substantially horizontal direction along the bottom surface 45 of the case body 30. The horizontal section 58 includes a main portion 58C in a central portion in a longitudinal direction thereof, and stand-up portions 58A and 58B that stand upward at both end portions of the main portion 58C. The stand-up portion 58A is connected to the battery pack controller 28, and the stand-up portion 58B is continuous with the vertical section 59 of the internal cable 35.

The vertical section 59 of the internal cable 35 extends upward from the stand-up portion 58B of the horizontal section 58 to the cover member 31 inside of the case body 30, and is connected to the power supply apparatus side connector 36 attached to the cover member 31. The vertical section 59 includes a play portion 59A that is indispensable to an opening/closing action using the hinge 56 of the cover member 31. The play portion 59A is curved at the time of the closing action of the cover member 31 and is substantially straight at the time of the opening action of the cover member 31.

As described above, inside of the battery pack case 25, the foam 29 fills the space between the case body 30 and the battery pack 26, the battery pack holder 27, and the battery pack controller 28. A cable housing portion 63 that houses the vertical section 59 of the internal cable 35 is formed between the foam 29 and the case body 30. The cable housing portion 63 extends in the vertical direction inside of the case body 30, is set to have a size equal to a substantially entire height of the case body 30 in a range between the bottom surface 45 of the case body 30 and the cover member 31, and has a space that enables movement or deformation of the vertical section 59 (including the play portion 59A). In contrast, the horizontal section 58 of the internal cable 35 is immovable while the main portion 58C thereof is sandwiched between the bottom surface 45 of the case body 30 and the foam 29.

The present embodiment configured as described above provides the following advantageous functions and effects (1) to (4).

(1) As illustrated in FIG. 5, the vertical section 59 of the internal cable 35 includes the play portion 59A that is indispensable to the opening/closing action of the cover member 31 of the power supply apparatus 11. Even in this case, the vertical section 59 is housed in the cable housing portion 63 that extends in the vertical direction inside of the case body 30 and has the size equal to the substantially entire height of the case body 30 in the range between the bottom surface 45 and the cover member 31. Accordingly, at the time of the closing action of the cover member 31, the play portion 59A of the vertical section 59 is gently curved, and friction and other problems can be prevented. As a result, even in the case where the internal cable 35 of the cable 57 includes the play portion 59A that is indispensable to the opening/closing action using the hinge 56 of the cover member 31, durability of the internal cable 35 can be improved.

(2) The vertical section 59 of the internal cable 35 disposed inside of the power supply apparatus 11 is movable or deformable in the inside of the cable housing portion 63, whereas the main portion 58C of the horizontal section 58 thereof is immovable while being sandwiched between the bottom surface 45 of the case body 35 and the foam 29. Accordingly, a position of the stand-up portion 58A of the horizontal section 58 of the internal cable 35 is kept fixed, and hence, the connection between the stand-up portion 58A and the battery pack controller 28 can be stably held.

(3) As illustrated in FIG. 4 and FIG. 5, in the power supply apparatus 11, the battery pack 26 is housed in the battery pack case 25 including the case body 30 and the cover member 31. Then, the cover member 31 liquid-tightly closes the opening 30A of the case body 30 by using the seal material 32, and the seal material 38 is interposed between the power supply apparatus side connector 36 that is part of the cable 57 and the cover member 31. Hence, the power supply apparatus 11 can provide a waterproof structure. Accordingly, the power supply apparatus 11 thus configured can be used as an electric power source of the electric outboard motor 10 that may be exposed to water.

(4) The horizontal section 58 of the internal cable 35 extends in the substantially horizontal direction along the bottom surface 45 of the case body 30, and the stand-up portions 58A and 58B stand upward at both the end portions of the main portion 58C. The stand-up portion 58B is continuous with the vertical section 59 of the internal cable 35, and the stand-up portion 58A is connected to the battery pack controller 28. Accordingly, even if water invades the battery pack case 25, since the stand-up portion 58A of the horizontal section 58 of the internal cable 35 is positioned to a level higher than that of the main portion 58C, the connection portion between the stand-up portion 58A and the battery pack controller 28 can be reliably prevented from being exposed to the water.

In the above-mentioned embodiment, for example, the horizontal section 58 of the internal cable 35 of the cable 57 may be sandwiched between: the battery pack 26, the battery pack holder 27, or the battery pack controller 28; and the foam 29, instead of being sandwiched between the bottom surface 45 of the case body 30 and the foam 29.

In the present embodiment, the external cable 12 that extends from the main body 13 of the outboard motor 10 and the internal cable 35 inside of the power supply apparatus 11 are detachably connected to each other by the outboard motor side connector 37 attached to the external cable 12 and the power supply apparatus side connector 36 attached to the internal cable 35. Alternatively, the internal cable 35 may penetrate through the cover member 31 of the battery pack case 25 so as to extend externally outside of the power supply apparatus 11 and may be directly connected to the main body 13 of the electric outboard motor 10.

Figure 8:
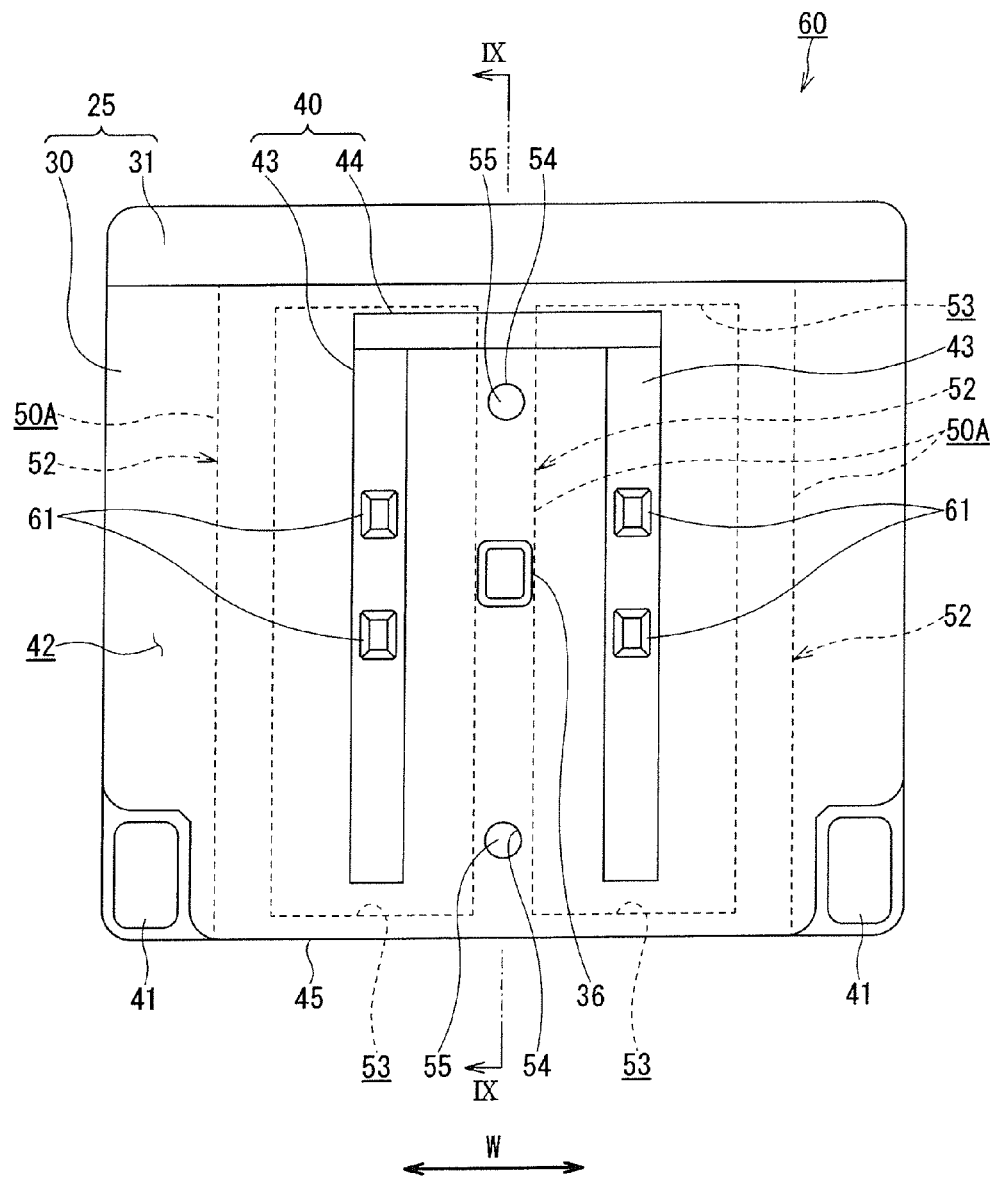
FIG. 8 is a rear view illustrating a second embodiment of the power supply apparatus according to the present invention.
Figure 9:
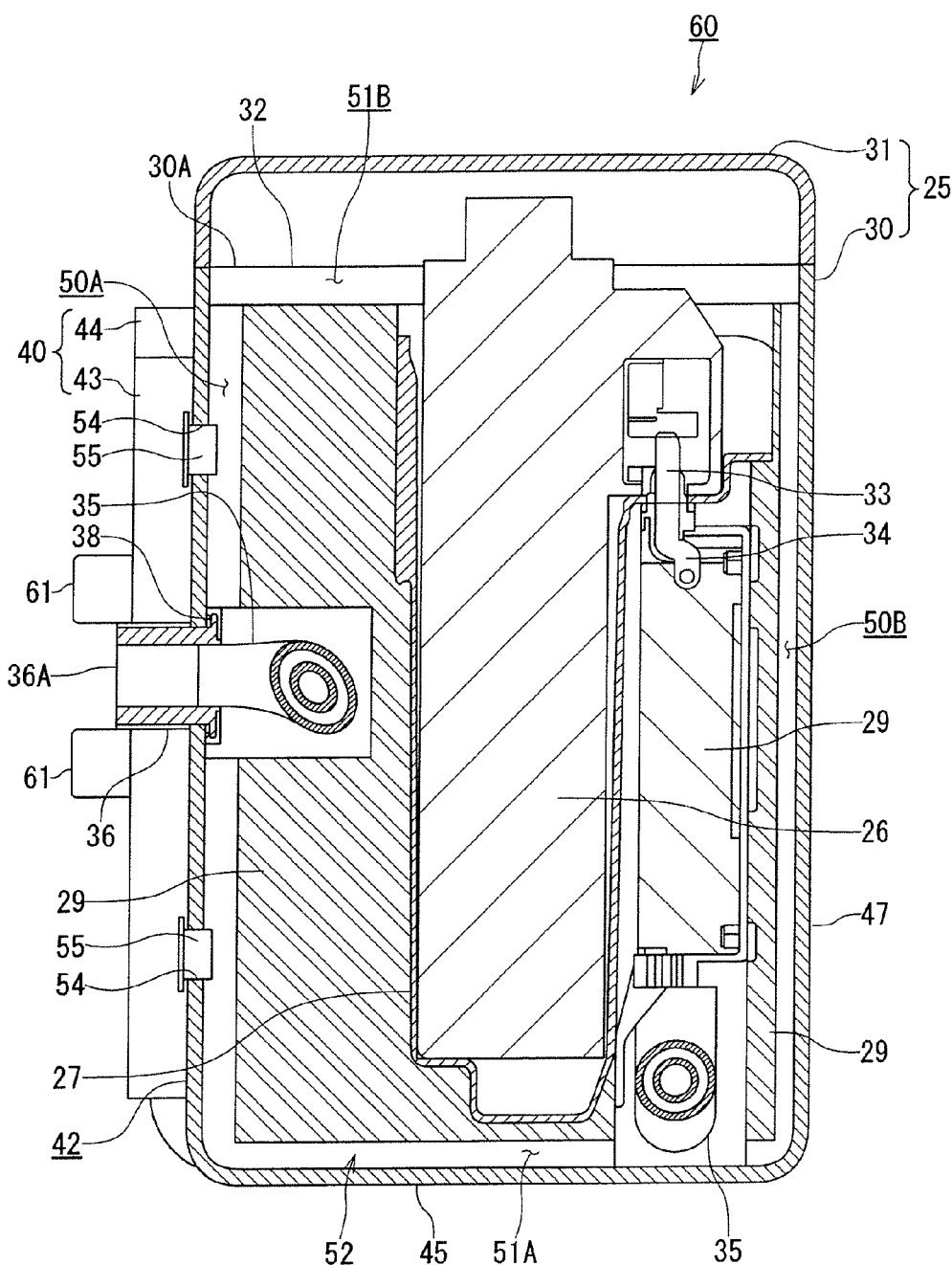
FIG. 9 is a cross sectional view taken along the line IX-IX in FIG. 8.
Figure 10:
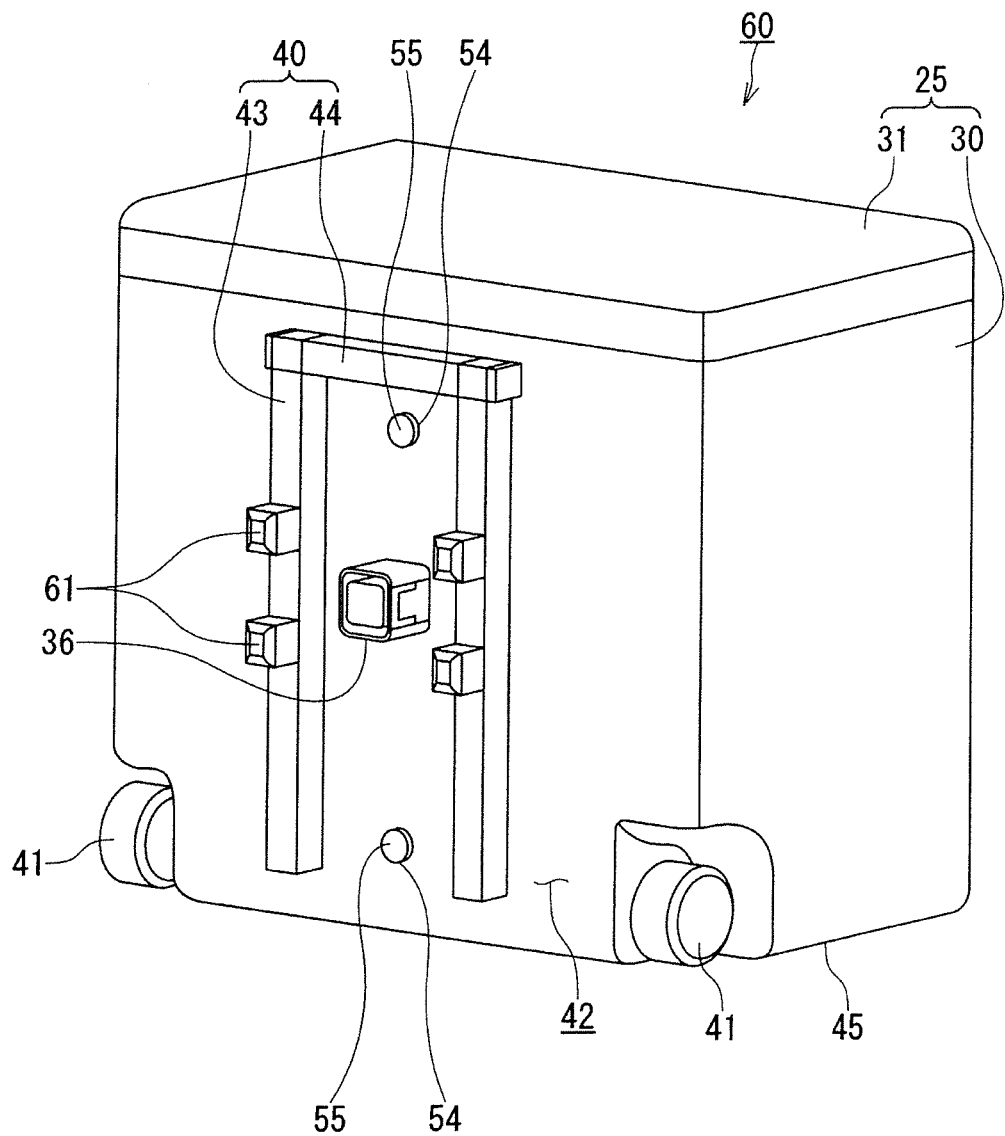
FIG. 10 is a perspective view illustrating the power supply apparatus of FIG. 8.

Second Embodiment (FIG. 8 to FIG. 10)

FIG. 8 is a rear view (back-side view) representing a second embodiment of the power supply apparatus according to the present invention. In the second embodiment, components similar to those in the first embodiment are denoted by the same reference numerals, and description thereof is hence simplified or omitted herein.

A power supply apparatus 60 of the second embodiment is different from the power supply apparatus 11 of the first embodiment in that the power supply apparatus side connector 36 is provided on the rear surface 42 (on which the carrying handle 40 is provided) of the case body 30 of the battery pack case 25.

That is, as illustrated in FIG. 8 to FIG. 10, the power supply apparatus side connector 36 is disposed between the pair of shaft portions 43 of the carrying handle 40 on the rear surface 42 of the case body 30. Protective projections 61 for reliably protecting the power supply apparatus side connector 36 against an obstacle are formed on the shaft portions 43 at substantially same positions as that of the power supply apparatus side connector 36 in the vertical direction of the power supply apparatus 60.

The seal material 38 is interposed between the rear surface 42 of the case body 30 and the power supply apparatus side connector 36. The seal material 32 is interposed between the case body 30 and the cover member 31. The ventilation holes 54 are respectively formed in the upper portion and the lower portion of the rear surface 42 of the case body 30 so as to be communicated with the vertical passage 50A.

The filter apparatus 55 are respectively placed in the ventilation holes 54. According to such arrangement, the battery pack case 25 of the power supply apparatus 60 can provide a liquid-tight structure.

Accordingly, in the power supply apparatus 60 of the second embodiment, the ventilation hole 54 is also formed between the pair of shaft portions 43 of the carrying handle 40 in each of the upper portion and the lower portion of the rear surface 42 of the case body 30 of the battery pack case 25 so as to be communicated with the vertical passage 50A of the circulation passage 52, and the filter apparatus 55 is disposed in the ventilation hole 54. Hence, the second embodiment can provide functions and effects similar to those (1) to (6) of the first embodiment, and additionally provides the following effects (7) and (8).

(7) The battery pack case 25 that constitutes the power supply apparatus 60 needs to be fixed to the hull 16 so as not to move due to vibrations or other reasons during sailing of the boat (i.e., hull 16). In this case, in order not to hinder movement or operation of a passenger, it is preferable that the power supply apparatus 60 is installed such that a side surface of the battery pack case 25 abuts against a side plate 16C (see FIG. 2) or the transom 16A of the hull 16.

In a structure in which the power supply apparatus 60 includes the carrying handle 40 and the wheels 41, the power supply apparatus 60 is inclined for movement toward the side on which the carrying handle 40 and the wheels 41 are provided. Hence, it is preferable that the rear surface 42 on which the carrying handle 41 and the wheels 41 are provided face a near side and that the front surface 47 opposite thereto abut against the transom 16A or the side plate 16C of the hull 16.

In the power supply apparatus 60 of the second embodiment, the power supply apparatus side connector 36 is provided on the rear surface 42 of the case body 30, and the power supply apparatus 60 is installed on the hull 16 such that the front surface 47 of the case body 30 abuts against the transom 16A or the side plate 16C of the hull 16. Accordingly, the power supply apparatus side connector 36 can be prevented from hindering the mounting of the power supply apparatus 60.

(8) The power supply apparatus side connector 36 is disposed between the pair of shaft portions 43 of the carrying handle 40 on the rear surface 42 of the case body 30, and the protective projections 61 are provided on the shaft portions 43. Accordingly, the power supply apparatus side connector 36 can be prevented from colliding with an obstacle to be damaged particularly during the movement of the power supply apparatus 60.

Figure 11:
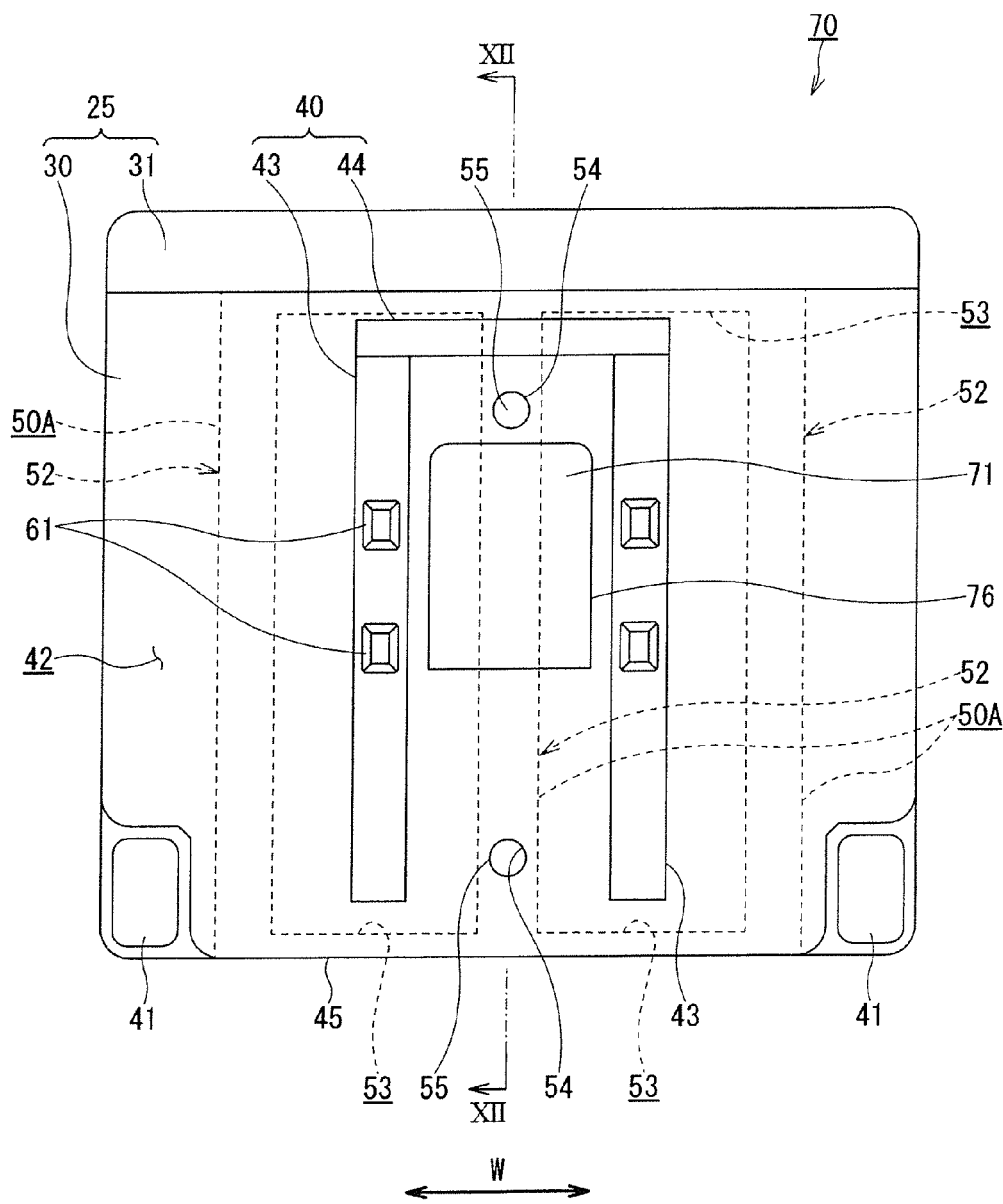
FIG. 11 is a rear view illustrating a third embodiment of the power supply apparatus according to the present invention.
Figure 12:
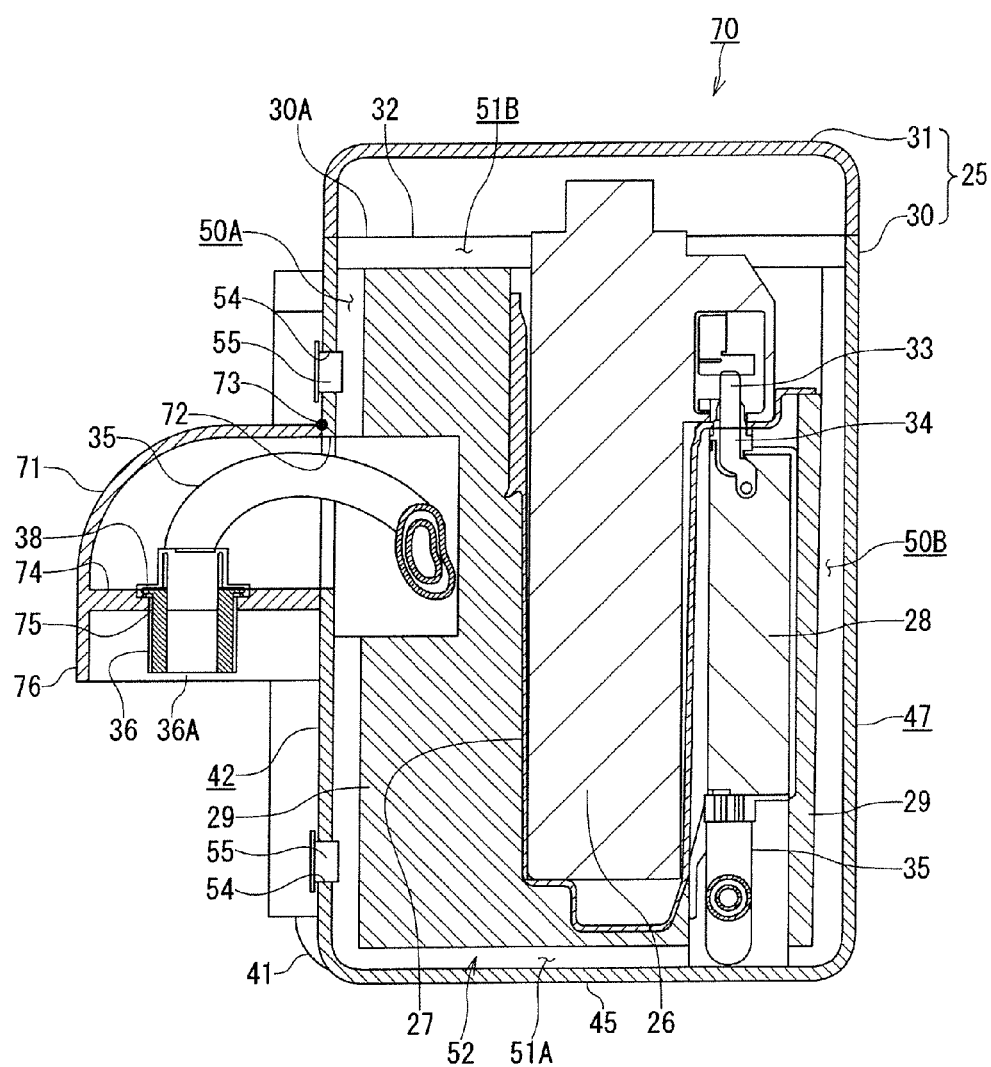
FIG. 12 is a cross sectional view taken along the line XII-XII in FIG. 11.

Third Embodiment (FIG. 11 and FIG. 12)

FIG. 11 is a rear view illustrating a third embodiment of the power supply apparatus according to the present invention. In the third embodiment, components similar to those in the first and second embodiments are denoted by the same reference numerals, and description thereof is hence simplified or omitted herein.

A power supply apparatus 70 of the third embodiment is different from the power supply apparatus 11 of the first embodiment in that a connector holder 71 is provided on the rear surface 42 (on which the carrying handle 40 is provided) of the case body 30 of the battery pack case 25 so as to protrude in an eave-shaped manner and in that the power supply apparatus side connector 36 is attached to the connector holder 71 with a connection port 36A thereof facing downward.

That is, as illustrated in FIG. 11 and FIG. 12, an opening 72 is formed in the rear surface 42 of the case body 30 of the battery pack case 25, and the connector holder 71 is attached so as to cover the opening 72. A seal material 73 is interposed between the connector holder 71 and the periphery of the opening 72 of the case body 30. In the connector holder 71, a connector mount port 75 is formed in a base section 74 that extends in the horizontal direction, and the power supply apparatus side connector 36 is attached to the connector mount port 75 with the connection port 36A facing downward. Then, a rib 76 extends from the periphery of the base section 74 of the connector holder 71 so as to surround the power supply apparatus side connector 36.

A seal material 38 is interposed between the power supply apparatus side connector 36 and the base section 74 of the connector holder 71. By the location of the seal materials 73 and 38, the seal material 32 interposed between the case body 30 and the cover member 31, and the filter apparatus 55 disposed in the ventilation holes 54 formed in the upper portion and the lower portion of the rear surface 42 of the case body 30, the battery pack case 25 of the power supply apparatus 70 can provide the liquid-tight structure.

Accordingly, in the power supply apparatus 70 of the third embodiment, the ventilation hole 54 is also formed between the pair of shaft portions 43 of the carrying handle 40 in each of the upper portion and the lower portion of the rear surface 42 of the case body 30 of the battery pack case 25 so as to be communicated with the vertical passage 50A of the circulation passage 52, and the filter apparatus 55 is disposed in the ventilation hole 54. Accordingly, the third embodiment can provide effects similar to the effects (1) to (6) of the first embodiment, and additionally provides the following advantageous effect (7).

(7) In the power supply apparatus 70, the connector holder 71 protrudes from the rear surface 42 of the case body 30 of the battery pack case 25, the power supply apparatus side connector 36 is attached to the base section 74 of the connector holder 71 with the connection port 36A facing downward, and the rib 76 is provided to the base section 74 so as to surround the power supply apparatus side connector 36. Accordingly, rainwater and wave splashes during sailing of a boat are poured on the power supply apparatus 70 mounted on the hull 16 from upper or oblique side. Accordingly, such rainwater and wave splashes are blocked by the connector holder 71 and the rib 76 from pouring on the power supply apparatus side connector 36. Accordingly, the connection port 36A of the power supply apparatus side connector 36 can be prevented from being directly exposed to the rainwater and the wave splashes.

Figure 13A:
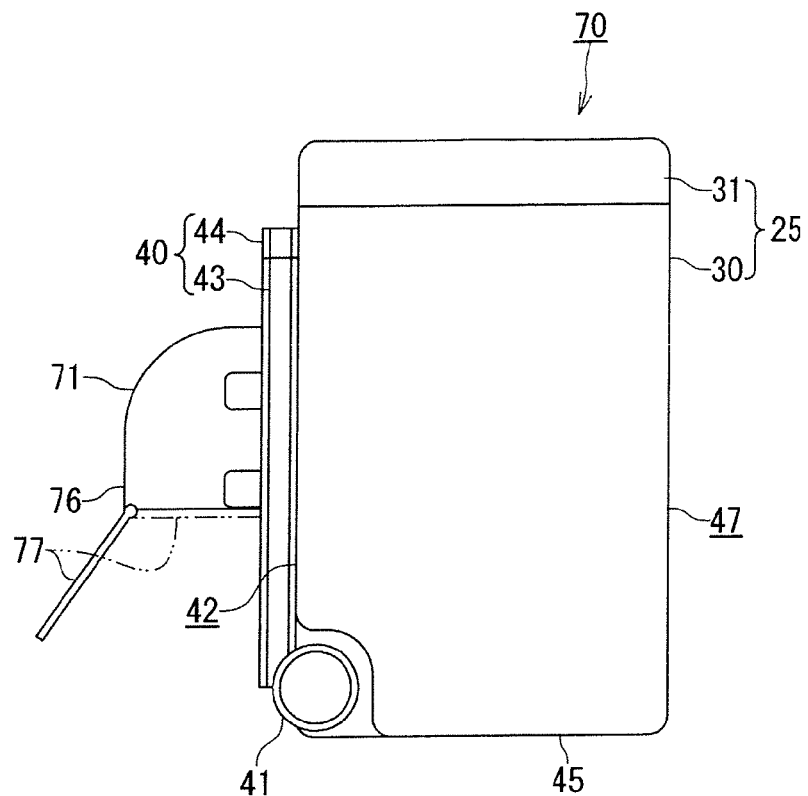
FIG. 13A is a side view.
Figure 13B:
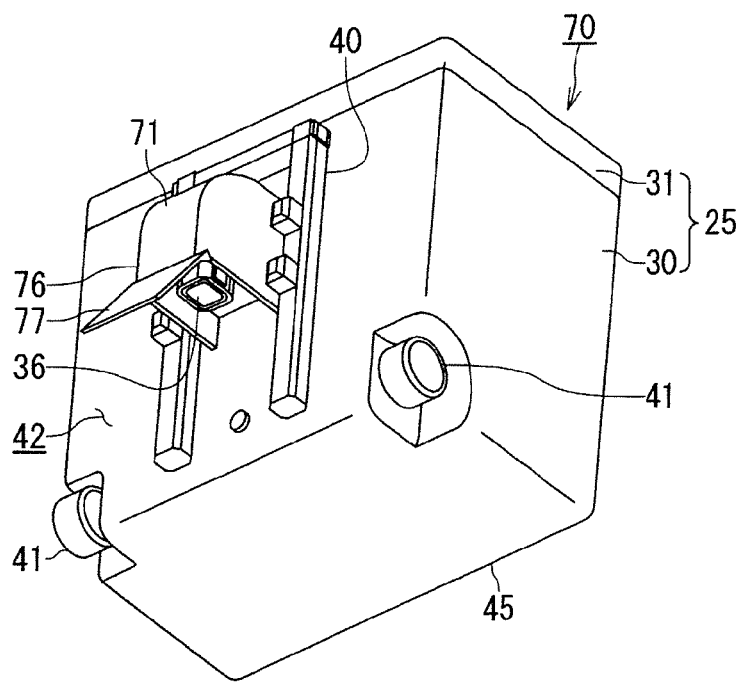
FIG. 13B is a perspective view observed obliquely from below.

As illustrated in FIG. 13, a lid 77 that openably closes an opening of the rib 76 may be provided so as to reliably cover the connection port 36A of the power supply apparatus side connector 36. In this case, the waterproof property of the connection port 36A of the power supply apparatus side connector 36 can be further improved by the lid 77.

For example, in the described embodiments, the external cable 12 that extends from the main body 13 of the electric outboard motor 10 and the internal cable 35 inside of the power supply apparatus 11, 60, 70 are detachably connected to each other by the outboard motor side connector 37 attached to the external cable 12 and the power supply apparatus side connector 36 attached to the internal cable 35. Alternatively, however, the internal cable 35 may be arranged to penetrate through the case body 30 or the cover member 31 of the battery pack case 25 so as to extend to the outside of the power supply apparatus 11, 60, 70 and may be directly connected to the outboard motor main body 13.

It is to be noted that, although the embodiments of the present invention have been described hereinbefore, the embodiments are given as mere examples, and are not intended to limit a scope of the present invention, and the embodiments can be carried out in other various modes, and can be variously omitted, replaced, and modified within the scope of the appended claims without departing from a spirit of the present invention.

What is claimed is:

1. A power supply apparatus that supplies electric power to an electric outboard motor for a hull through a cable, the power supply apparatus comprising:
   a battery pack;
   a battery pack mount unit to or from which the battery pack is attached or detached;
   a battery pack controller that manages a state of the battery pack; and
   a battery pack case that has a box-shape structure and houses the battery pack, the battery pack mount unit, and the battery pack controller,
   wherein the battery pack case includes:
      a case body having an opening through which the battery pack is inserted or removed,
      a cover member that closes the opening of the case body so as to be liquid tight, a ventilation hole penetrating through one side surface of an outer wall of the case body,
      a filter apparatus provided in the ventilation hole that prohibits liquid to pass therethrough but allows gas to pass therethrough,
      an electric power take-out section formed in the one side surface and supplying the electric power from the battery pack to the electric outboard motor through the cable,
      a seal material having a liquid-tight function and provided to the electric power take-out section, a carrying handle including a pair of expandable and contractible tubular shaft portions that extends in a vertical direction of the battery pack case, is attached to the one side surface from outside, and is positioned at each of a expanded position and a contracted position, and including a handle section bridged between leading ends of the shaft portions, and wheels disposed in a lower corner portion of the one side surface to assist movement using the carrying handle, and wherein a gap is provided between the battery pack case and the battery pack, and the ventilation hole is formed in each of an upper portion and a lower portion of the one side surface so as to communicate with the gap, the upper portion being located on the upper side of the one side surface in a vertical direction and the lower portion being located on the lower side of the one side surface in the vertical direction, and wherein the ventilation hole formed in each of the upper portion and the lower portion of the one side surface and the electric power take-out section formed in the one side surface are formed in an area of the one side surface defined below the handle section in the contracted position and between the pair of shaft portions.

2. The power supply apparatus according to claim 1, further comprising a buffer member that holds the battery pack and is disposed between the battery pack case and the battery pack, wherein the buffer member includes a vertical passage formed in a concave groove shape so as to extend in a vertical direction of the battery pack case between the buffer member and the battery pack case, wherein the vertical passage is defined by the gap between the battery pack case and the battery pack, and wherein the ventilation hole is located in each of an upper portion and a lower portion of the vertical passage.

3. The power supply apparatus according to claim 1, wherein a buffer member that holds the battery pack is disposed between the battery pack case and the battery pack, the buffer member is formed with a vertical passage on each of a front surface and a rear surface thereof, the vertical passage being formed in a concave groove shape so as to extend in a vertical direction of the battery pack case between the buffer member and the battery pack case, the vertical passage being defined as the predetermined gap between the battery pack case and the battery pack, and upper portions of the vertical passages are communicated with each other by a horizontal passage while lower portions thereof are communicated with each other by a horizontal passage, the vertical passages and the horizontal passages form a circulation passage so as to circulate gas therethrough, and the ventilation hole is located in each of an upper portion and a lower portion of the circulation passage.

4. The power supply apparatus according to claim 2, wherein the buffer member is an independent foamed material having elasticity.

5. The power supply apparatus according to claim 4, wherein the external electrical device is an electric outboard motor, and the electric power is supplied from the battery pack via the cable to an electric motor included in the electric outboard motor.

6. The power supply apparatus according to claim 1,
wherein the cover member is connected to the case body by a hinge so as to open and close the opening of the case body, wherein the cable is divided into an internal cable section that is connected to the battery pack and extends in the case body to the cover member, and an external cable section that extends from the cover member to the external electrical device, wherein the internal cable section includes a horizontal portion and a vertical portion, wherein the horizontal portion is connected to the battery pack and extends in a substantially horizontal direction along a bottom surface of the case body, wherein the vertical portion extends in the case body upward from the horizontal portion to the cover member and includes a play portion that is moved with an opening and closing action of the cover member, and wherein the cable housing portion that houses the vertical section is provided in a range between the bottom surface of the case body and the cover member inside of the case body.

7. The power supply apparatus according to claim 6, wherein the battery pack is held by a buffer member disposed between the battery pack case and the battery pack, and the horizontal portion of the internal cable section is immovable while being sandwiched between the buffer member and the case body, whereas the vertical section thereof is movable or deformable inside of a space of the cable housing portion.

8. The power supply apparatus according to claim 7, wherein the cover member closes the opening of the case body so as to make the case body liquid tight using a liquid-tight seal material provided with respect to the cable.

9. The power supply apparatus according to claim 8, wherein the horizontal portion of the internal cable section includes a pair of stand-up portions that stand upward in both end portions thereof, wherein one of the stand-up portions is connected to the battery pack, and another one of the stand-up portions is coupled to the vertical portion of the internal cable section.

10. The power supply apparatus according to claim 9, wherein the external electrical device is an electric outboard motor, and the electric power is supplied from the battery pack via the cable to an electric motor included in the electric outboard motor.

11. The power supply apparatus according to claim 1, wherein an electric power take-out section of the power supply apparatus that supplies the electric power therefrom to the electric outboard motor is provided on the one side surface of the outer wall of the case main body of the battery pack case on which the carrying handle is provided.

12. The power supply apparatus according to claim 1, wherein the electric power take-out section including a connector unit that makes the cable connected to the electric outboard motor detachable.

13. The power supply apparatus according to claim 12, wherein the connector unit is attached to a connector holder with a connection port thereof facing downward, the connector holder protruding in eave shape from the one side surface of the outer wall of the case body of the battery pack case.

14. The power supply apparatus according to claim 1, wherein the battery pack case is provided with an engaging portion to be engaged with a lock portion provided on the hull, wherein the engaging portion is located on another side surface opposite to the one side surface of the outer wall of the case body on which the carrying handle and the wheels are provided.

15. The power supply apparatus according to claim 11,
wherein the battery pack case further includes protective projections protecting the electric power take-out section against the obstacle, and wherein the protective projections are formed on the shaft portions such that the protective projections are positioned at substantially same positions as that of the electric power take-out section in the vertical direction of the battery pack case the carrying handle is positioned at the contracted position.

\* \* \* \* \*